United States Patent [19]
Pidgeon

[11] 3,766,924
[45] Oct. 23, 1973

[54] NASAL TAMPONS

[75] Inventor: Rosemary Sylvia Vyvyan Pidgeon, London, England

[73] Assignee: Matburn (Holdings) Limited, London, England

[22] Filed: Jan. 26, 1972

[21] Appl. No.: 220,816

[30] Foreign Application Priority Data
Feb. 4, 1971 Great Britain.................... 3,890/71

[52] U.S. Cl.............. 128/325, 128/344, 128/349 B
[51] Int. Cl............................................ A61b 17/12
[58] Field of Search.................. 128/325, 342, 344, 128/349 B, 349 BV, 129

[56] References Cited
UNITED STATES PATENTS
2,265,387  12/1941  McMillin ....................... 128/325 X
2,493,326  1/1950   Trinder .......................... 128/342 X
3,154,077  10/1964  Cannon ............................. 128/325

Primary Examiner—Richard A. Gaudet
Assistant Examiner—Lee S. Cohen
Attorney—William R. Liberman

[57] ABSTRACT

A nasal tampon, that is to say a device for arresting nasal haemorrhage comprises a lumen tube an end of which can be entered into the nostril of a patient. An inflatable balloon is provided at this end of the lumen tube and a closure is provided at the other end. The balloon can be inflated by passing air through the lumen tube. An inflatable sleeve or cuff is slidable on the outside of the lumen tube. An inflation tube leads to the inflatable sleeve or cuff and a closure is provided at the end of the inflation tube.

3 Claims, 2 Drawing Figures

NASAL TAMPONS

BRIEF DESCRIPTION OF THE ACCOMPANYING DRAWINGS

FIG. 1 is an elevation of a nasal tampon (i.e., a device for arresting nasal haemorrhage) constructed in accordance with the invention, and FIG. 2 is a diagram illustrating the tampon in use.

DESCRIPTION OF THE PREFERRED EMBODIMENT

Figure 1:
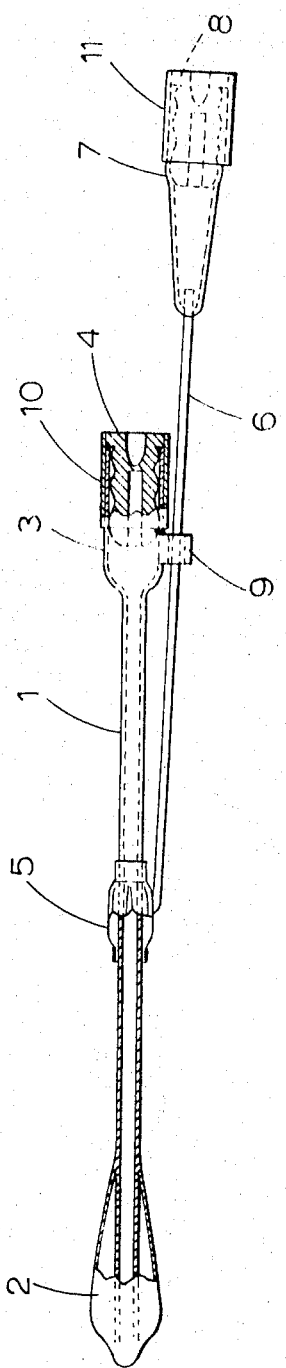

The intra-nasal tampon illustrated is made of natural or synthetic rubber or plastics material. The tampon comprises a lumen tube 1 which is surrounded at one end by an inflatable balloon 2, the balloon being inflated by means of air or other inflation medium passed through the passage in the lumen tube. The end of the lumen tube remote from the balloon 2 has a funnel 3 in which is arranged a closure which is a non-return valve 4, or alternatively, a plug. The purpose of this valve is to prevent air or other inflation material leaving the lumen tube after the balloon 2 has been inflated, thereby to prevent deflation of the balloon.

An inflatable sleeve or cuff 5 is slidable on the outside of the lumen tube 1. One end of an inflation tube 6 for air or other inflation medium leads into this sleeve or cuff 5. The other end of the inflation tube has a funnel 7 in which a non-return valve or, alternatively, a plug or other closure is arranged. This inflation tube is passed through a retaining ring 9 on the lumen tube. The non-return valves 4, 8 are retained in their respective valve funnels by means of rubber rings 10, 11 or the like on the outside of the funnels. If plugs are used, the rubber rings are not necessary.

The lumen tube is produced by dipping a former of the desired shape. The balloon is made by a dipping operation on a suitably shaped former. The balloon is then fitted loosely over the end of the lumen tube and an external layer is formed over the tube and the balloon by overdipping. The lumen tube can alternatively be produced by an extrusion method.

Figure 2:
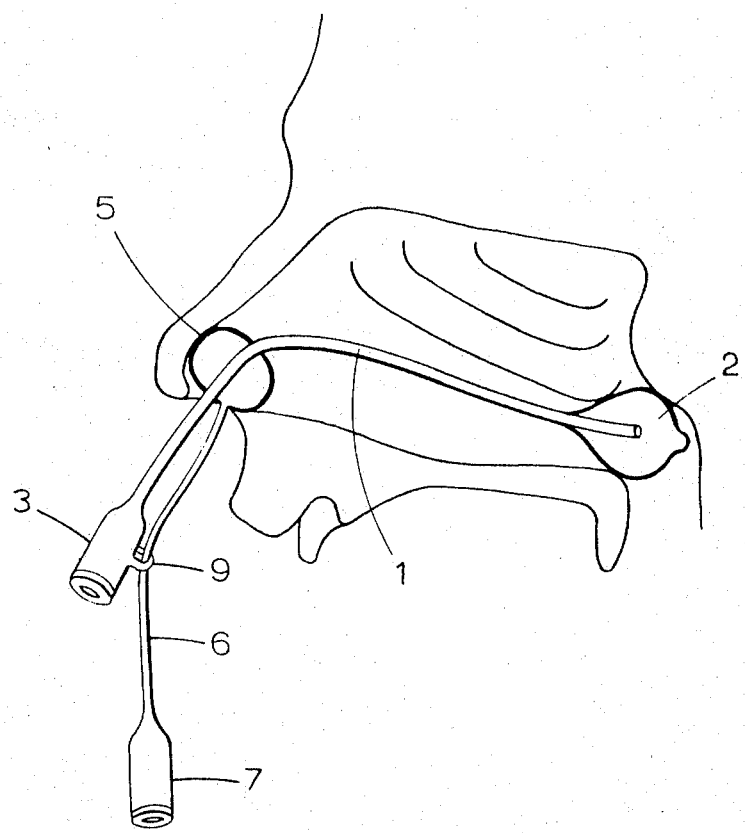

In operation, the balloon is, as shown in FIG. 2, inserted into a nostril of a patient with the balloon 2 in the non-inflated condition. Insertion continues until the balloon passes the back of the nasal cavity known as the posterior nares of choana. The balloon 2 is then inflated with 10 to 15 ml. of air introduced through funnel 3, and the lumen tube is gently pulled so that the balloon wedges in the posterior nares or choana. The tension is maintained while the sleeve or cuff 5 is pushed along the lumen tube into the nose until it is within the nasal vestibule, sealing the anterior nares. The sleeve or cuff is then inflated by air introduced through funnel 7, in order to maintain the tension between the balloon and the sleeve or cuff, effectively containing the blood within the nasal cavity and preventing further haemorrhage.

What is claimed is:

1. A nasal tampon comprising an elongated lumen tube for insertion into the nostril of a patient, said tube having a first inflatable balloon at one end thereof and closure means at the other end of the lumen tube through which said first balloon can be inflated, a second inflatable balloon circumferentially disposed about the lumen tube reciprocably slidable along the length thereof, a second elongated tube, independent of said lumen tube and freely movable with respect thereto communicating at one end of said tube with said second inflatable balloon whereby the latter can be freely reciprocated along the length of the lumen tube, and closure means for said second tube through which said second balloon can be inflated.

2. A nasal tampon as in claim 1, wherein said other end of the lumen tube is provided with means to support the second elongated tube while permitting reciprocating sliding movement thereof to shift the second balloon along the lumen tube to vary the distance between the two balloons as desired.

3. A nasal tampon as in claim 2, wherein the second tube supporting means comprises an apertured integral retainer depending from the lumen tube adjacent its said other end and the second tube is loosely threaded through said apertured retainer.

* * * * *